United States Patent [19]

Beatty

[11] 4,364,315
[45] Dec. 21, 1982

[54] CONVERTIBLE RAIL-HIGHWAY VEHICLE SUPPORT SYSTEM

[75] Inventor: William T. Beatty, Scotts, Mich.

[73] Assignee: Rail-Or-Trail Corp., Kalamazoo, Mich.

[21] Appl. No.: 182,349

[22] Filed: Aug. 29, 1980

[51] Int. Cl.³ .................. B60F 1/00; B61D 15/00; B61F 13/00; B62D 61/12
[52] U.S. Cl. .................. 105/215 C; 105/159; 410/45; 410/53
[58] Field of Search ............ 105/157 R, 159, 180, 105/182 R, 215 C; 410/45, 53

[56] References Cited

U.S. PATENT DOCUMENTS

| | | | |
|---|---|---|---|
| 1,446,784 | 2/1923 | Carter | 105/215 C |
| 1,543,452 | 6/1925 | Seitz et al. | 105/215 C |
| 1,824,196 | 9/1931 | Cullen et al. | 105/215 C |
| 1,863,575 | 6/1932 | Moncrieff et al. | 105/215 C |
| 1,931,919 | 10/1933 | Beardslee et al. | 295/8.5 |
| 2,018,972 | 10/1935 | Pollock et al. | 105/215 C |
| 2,032,219 | 2/1936 | Mock | 105/215 C |
| 2,116,525 | 5/1938 | Luce | 105/215 C |
| 2,138,043 | 11/1938 | Ronk | 105/215 C |
| 2,140,885 | 12/1938 | Soulis | 105/215 C |
| 2,154,139 | 4/1939 | Schmohl | 105/159 |
| 2,889,785 | 6/1959 | Browne | 105/215 C |
| 2,981,209 | 4/1961 | Flemming | 410/53 |
| 3,342,141 | 9/1967 | Browne | 105/215 C |
| 3,875,870 | 4/1975 | Beatty | 105/215 C |

Primary Examiner—Robert B. Reeves
Assistant Examiner—Howard Beltran
Attorney, Agent, or Firm—Blanchard, Flynn, Thiel, Boutell & Tanis

[57] ABSTRACT

A convertible rail-highway vehicle having a semi-trailer with a truck provided adjacent the rear of the trailer with connecting structure for pivotally connecting the truck to a central beam for movement about a vertical axis. The truck has at least a pair of spaced and parallel axles for carrying at opposite ends thereof a pair of flanged wheels and a pair of highway wheels. The axes of rotation of the highway wheels are radially offset from the axes of rotation of flanged wheels. The axles are each rotatably supported in a pair of elongated and parallel bars which are, in turn, pivotally supported from a laterally extending support member on the truck. A releasable connection is provided adjacent the front end of the trailer for facilitating a selective connection to a highway tractor and to a further truck. A drive mechanism is provided on the rear truck and is operatively connected to each of the axles for effecting a rotary drive of the axles and a movement of the flanged wheels and highway wheels on each of the axles to an exchanged relation relative to the ground.

10 Claims, 10 Drawing Figures

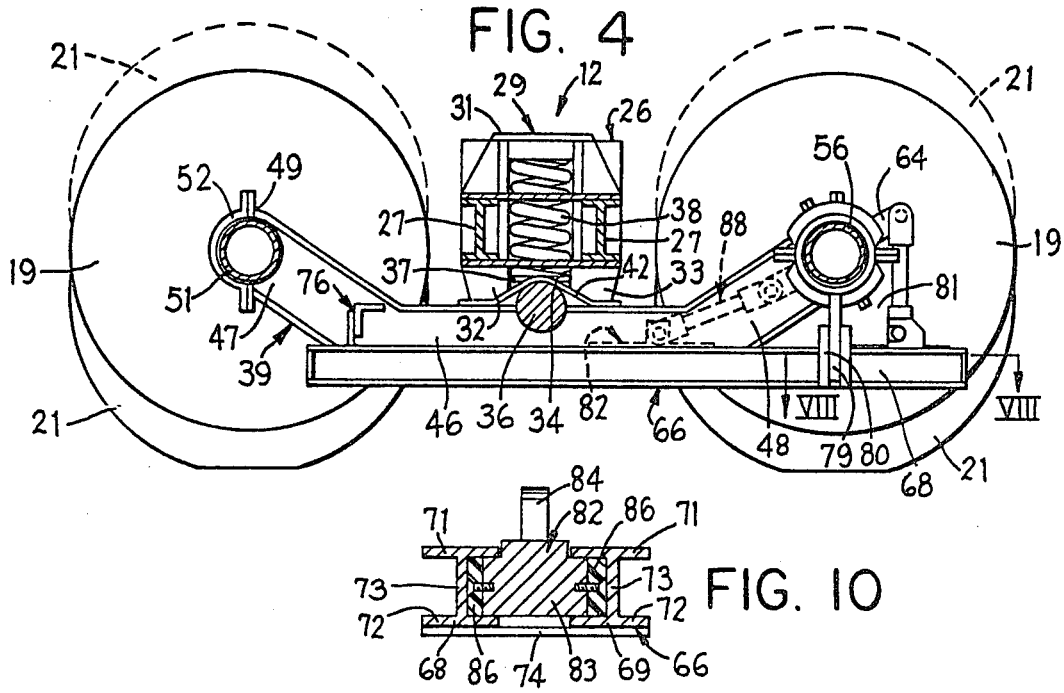
FIG. 4
FIG. 10
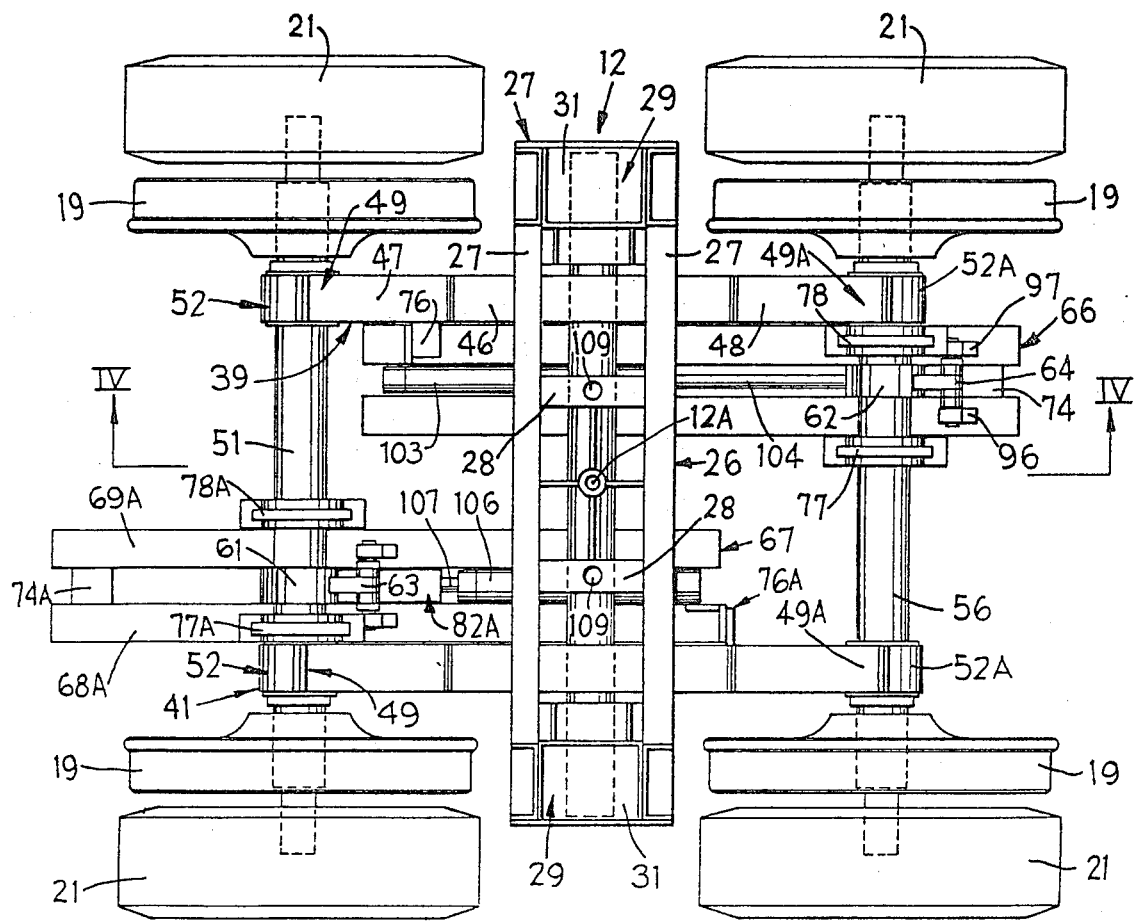
FIG. 3

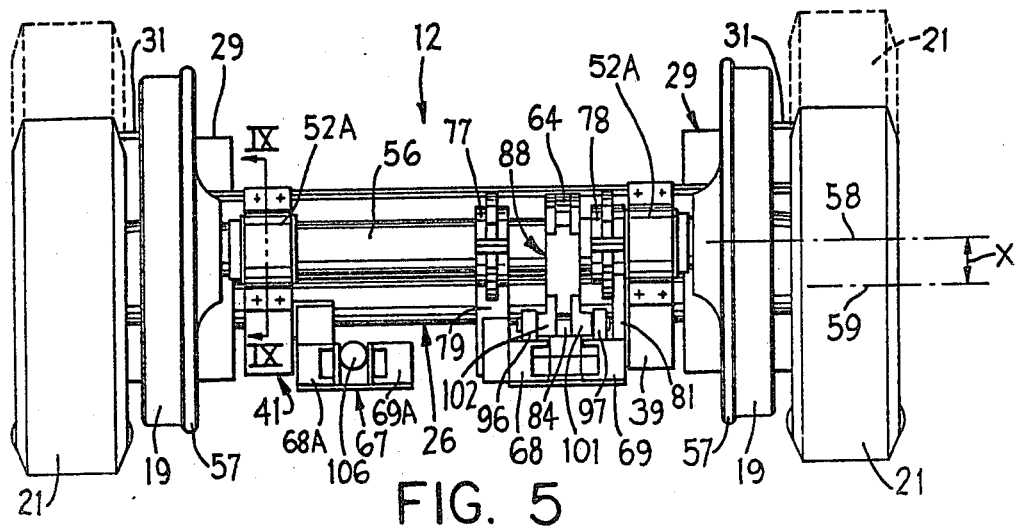
FIG. 5
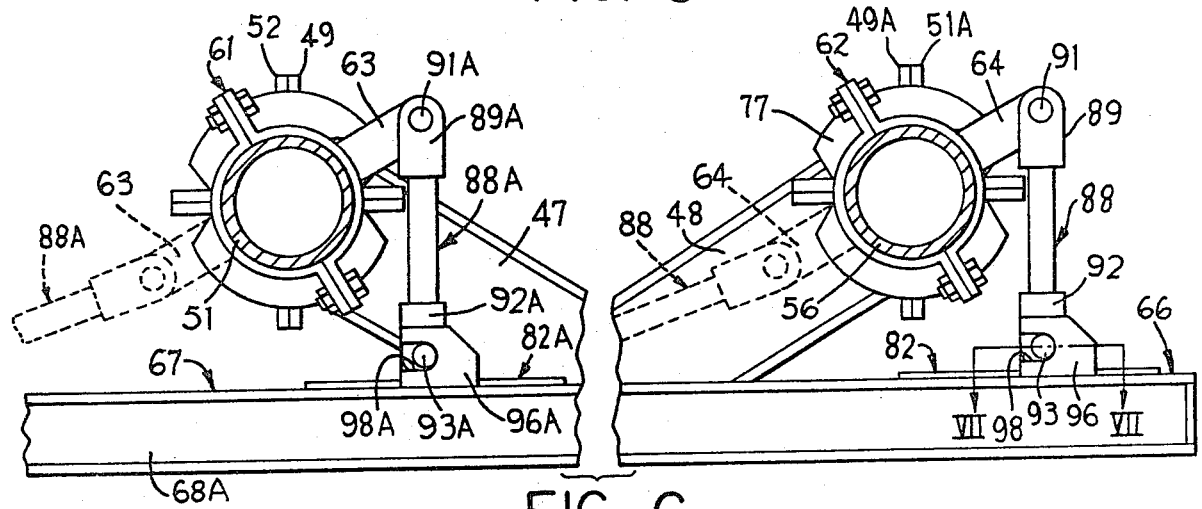
FIG. 6
FIG. 8
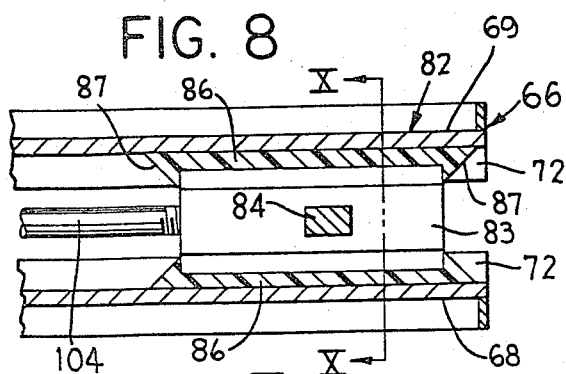
FIG. 9
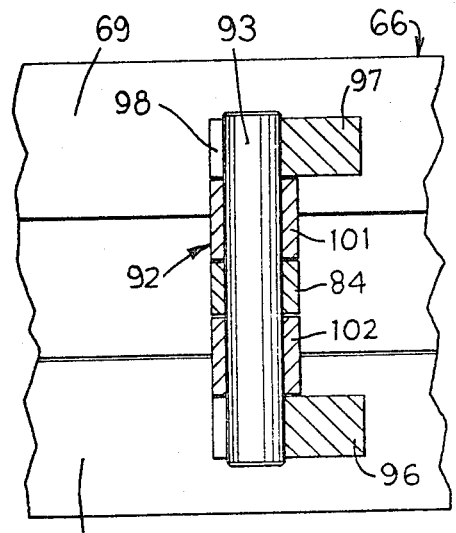
FIG. 7

CONVERTIBLE RAIL-HIGHWAY VEHICLE SUPPORT SYSTEM

FIELD OF THE INVENTION

This invention relates to a convertible rail-highway vehicle and, more particularly, relates to a truck construction rotatably supporting at least a pair of axles thereon and a drive arrangement operatively connected to the axles for effecting a rotary drive of the axles and a movement of radially offset flanged wheels and highway wheel on each of the axles to an exchanged relation relative to the ground.

BACKGROUND OF THE INVENTION

This invention arose out of the further developmental work associated with the subject matter of my U.S. Pat. No. 3,875,870. One of the problems confronting the use of the invention in my aforesaid patent is to counter the torque forces applied to the rotary axle arrangement when a heavy load is carried by the trailer and the brakes are applied to the highway wheels and in an environment wherein a tandem axle arrangement is utilized. Since the axis of rotation of the highway wheels is offset radially from the axis of rotation of the axle, the braking force applied to the highway wheels will effect the application of a torque to the axle. Thus, the drive arrangement for effecting a rotary drive of the axle had to be strong enough to resist the torque forces applied to it and yet be compact enough to be used in the minimum space available in and around the truck structure utilizing a tandem axle support.

The arrangement disclosed in Flemming U.S. Pat. No. 2,981,209 is wholly unsatisfactory for the same reasons as set forth in my aforesaid U.S. Pat. No. 3,875,870.

Accordingly, it is an object of this invention to provide on a truck which rotatably supports at least a pair of axles thereon and in a tandem drive arrangement for facilitating a rotary drive of the axles, and wherein a rotary drive arrangement is mounted on the truck structure.

A further object of this invention is to provide a stop structure which will rigidly hold the axles in a fixed position when the highway wheels are in engagement with the ground.

A further object of the invention is to provide a drive arrangement for the rotary axle construction which is compact enough to be mounted within the available space on a truck and be sufficiently strong to resist the rotary torque forces applied to the axle when the brakes are applied to the highway wheels as the trailer is moved down a highway or when the wheels are backed into an obstacle.

A further object of the invention is to provide a drive mechanism for effecting a rotary drive of the axle, as aforesaid, which has sufficient strength characteristics to effect a lifting of the trailer, when loaded, vertically upwardly as said highway wheels are driven into engagement with the ground.

A further object of the invention is to provide a drive arrangement for a rotary axle construction, as aforesaid, which is durable and easy to maintain.

SUMMARY OF THE INVENTION

The objects and purposes of the invention are met by providing a semi-trailer which has an elongated beam extending centrally and longitudinally thereof. A truck is pivotally connected to the beam adjacent the rear of the trailer. The truck includes at least a pair of spaced and parallel axles for carrying at opposite ends thereof a pair of flanged wheels and a pair of highway wheels. The axes of rotation of the highway wheels are radially offset from the axes of rotation of the flanged wheels. A pair of elongated and parallel bars are supported from a laterally extending support member mounted on the truck. Each of the bars is pivotally connected to the laterally extending support member for pivotal movement about an axis extending transversely of the longitudinal axis of the trailer. A universal joint coupling is provided on the bars and effects a coupling of each of the axles thereto for maintaining the parallel spacing between the axles, facilitating the movement of the bar about the laterally extending pivot axis and supporting each of the axles for rotation about the longitudinal axis thereof. A further releaseable connection is provided adjacent the front end of the trailer to facilitate a selective connection to a highway tractor and to a further truck. Drive means are provided on the rear truck and is operatively connected to each of the axles for effecting a rotary drive of the axles and a movement of the flanged wheels and the highway wheels on each of the axles to an exchanged relation relative to the ground.

BRIEF DESCRIPTION OF THE DRAWINGS

Other objects and purposes of this invention will be apparent to persons acquainted of apparatus of this general type upon reading the following specification and inspecting the accompanying drawings, in which:

FIG. 3 is a top view of the rear truck construction;

FIG. 4 is a sectional view taken along the line IV—IV of FIG. 3;

FIG. 5 is a rear view of the truck construction;

FIG. 6 is an enlarged showing of the connections between the rotary drive mechanism and each of the rotary axles;

FIG. 7 is a section view taken along the line VII—VII of FIG. 6;

FIG. 8 is a sectional view taken along the line VIII—VIII of FIG. 4;

FIG. 9 is a sectional view taken along the line IX—IX of FIG. 5; and

FIG. 10 is a sectional view taken along the line X—X of FIG. 8.

DETAILED DESCRIPTION

Figure 1:
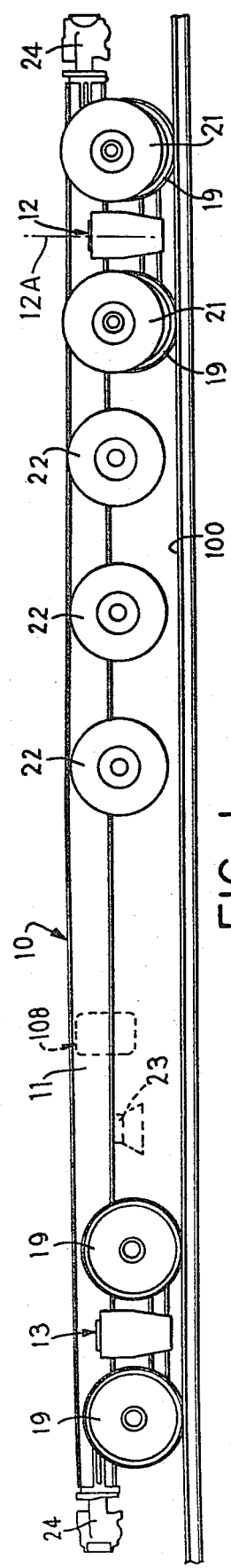
FIG. 1 is a side view of the convertible rail-highway vehicle supported for movement on a railway track and embodying my invention.

Certain terminology will be used in the following description for convenience and in reference only and will not be limiting. The words "up", "down", "right" and "left" will designate directions in the drawings to which reference is made. The words "front" and "rear" will refer to the front and rear of the vehicle illustrated in FIGS. 1 and 2, the front end thereof being illustrated at the left end. The words "in" and "out" will refer to directions toward and away from, respectively, the geometric center of the device and designated parts thereof. Such terminology will include derivatives and words of similar import.

Figure 2:
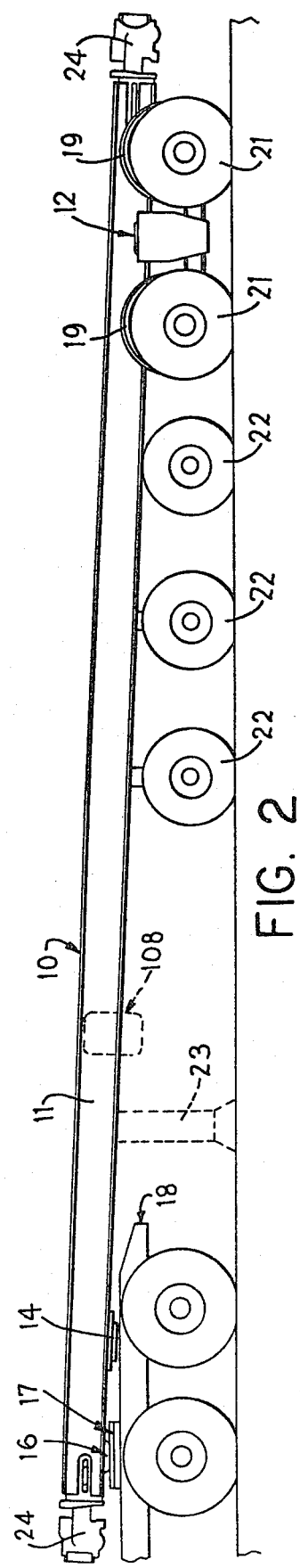
FIG. 2 is a similar view of the convertible rail-highway vehicle but supported for movement on a highway.

A convertible rail-highway vehicle 10 is illustrated in FIGS. 1 and 2 in the two positions of use thereof. The vehicle is illustrated in the railroad condition of use in FIG. 1 and the highway condition of use in FIG. 2. The vehicle has an elongated, centrally extending beam 11 for supporting a freight carrying frame (not illustrated) and which has, adjacent the rear right end thereof a rear truck 12 pivotally secured thereto by conventional structure for movement about a vertical axis 12A. The forward end of the vehicle has, when the vehicle is in the railroad condition of use thereof, a forward truck 13 pivotally secured thereto for movement about a vertical axis. In this particular embodiment, the front truck 13 is releaseably connected to a connection member 14 (FIG. 2) on the central beam 11, which connection member 14 is located rearwardly of the king-pin construction 16 for facilitating the connection of the front end of the vehicle 10 to a fifth wheel arrangement 17 on the rear end of a highway tractor 18. Each axle of the trucks 12 and 13 rotatably supports a pair of flanged wheels 19. Each axle of the rearmost truck 12 also rotatably supports a pair of highway wheels 21. The specific construction of the truck 12 will be described in greater detail herein below. When the load on the vehicle is of an appreciable weight, greater than the normal load restrictions per axle permitted by state laws to be applied to a pair of tandemly oriented highway wheels 21, additional highway wheels 22 can, if desired, be provided on the trailer 10, which additional highway wheels 22 are raisable and lowerable into a highway engaging position by conventional structure not illustrated. In addition, the front end of the trailer is also provided with a conventional landing gear structure 23 for facilitating a lifting of the front end of the trailer to facilitate the removal of the front truck 13 and the replacement thereof with a highway tractor 18 and a parking of the trailer when the front truck is removed from the trailer. The only modification really required to the conventional landing gear structure 23 is the provision of additional strengthening to the structure to enable the trailer 10, adjacent to front end thereof, to be raised a sufficient height to permit the movement of the fifth wheel arrangement 17 on the highway tractor 18 into engagement with the king-pin construction 16. The truck 13 is, in this particular embodiment, of a height to maintain the central beam 11 generally horizontally between the horizontally spaced front and rear trucks 13 and 12, respectively. In the highway condition of use for the trailer 10, it will be noted that the beam 11 is inclined slightly to the horizontal due to the difference in height between the fifth wheel arrangement and the rear truck.

Conventional cushioned railroad couplers 24 are provided on opposite ends of the central beam 11 and facilitate the coupling of the trailer unit 10 in the railway condition of use thereof, to other and conventional railroad cars.

Referring more specifically now to the truck 12 illustrated in FIGS. 3 and 4, it will be noted that the truck 12 comprises a laterally extending support structure 26 which is composed of a pair of horizontally spaced beams 27, the longitudinal axes of which extend perpendicular to the longitudinal axis of the center beam 11. Several cross members 28 are provided to rigidly maintain the fixed spacing between the beams 27. A box-like construction 29 is mounted on opposite ends of the beams 27. The box-like constructions 29 both have a plate 31 fixedly secured thereto and extending in a horizontal plane. A pair of block members 32 and 33 are secured to the lower sides of the beams 27 and defined a vertically extending and laterally facing guideway 34 therebetween. An elongated, laterally extending, cylindrical bar 36 is received in the guideway 34. A horizontal platform structure 37 is secured to opposite ends of the cylindrical bar 36 beneath each of the plates 31. At least one heavy-duty compression spring 38 is mounted on each of the platform structures 37 and extends therefrom upwardly into engagement with the underside of the respective plate 31.

In this particular embodiment, the cylindrical bar 36 is secured to a pair of laterally spaced and parallel "walking" beams 39 and 41. More specifically, the cylindrical bar 36 is secured to each of the walking beams 39 and 41 by a strap 42 weldably secured thereto, for example. Each of the walking beams 39 and 41 is pivotal with respect to the cylindrical bar 36 so that each walking beam will pivot about the longitudinal axis of the cylindrical bar. As a result, the walking beams 39 and 41 will also move vertically with the cylindrical bar 36 in the guideway 34 when sufficient loads are applied to effect a compression of the spring 38.

Each walking beam 39 and 41 has a central section 46, a front section 47, and a rear section 48. The central sections 46 extend generally horizontally whereas the front section 47 is inclined upwardly toward the front and the rear section 48 is inclined upwardly toward the rear. In this particular embodiment, the cylindrical bar 36 is secured to the central section 46 in the approximate center thereof. The forward end of the front sections 47 of each of the walking beams 39 and 41 terminates in a semi-cylindrical housing 49. The axes of the laterally spaced semi-cylindrical housings are axially aligned and receive an elongated and hollow axle 51 therein. A semi-cylindrical cap 52 is secured to the semi-cylindrical housing 49 by any conventional means not illustrated, as by plural nut and bolt fasteners. In FIG. 9, the semi-cylindrical housing 49 and the semi-cylindrical cap 52 are illustrated in greater detail. It will be noted that the axle 51 is encircled by a bushing 53 made of a low-friction material, which bushing is encircled by a rubber sleeve 54. The purpose of this construction is to rotatably support the axle 51 in the connected semi-cylindrical housing 49 and semi-cylindrical cap 52 encircling the bushing 53 and the sleeve 54. The rubber sleeves 54 encircling each end of the axle 51 facilitates a movement of the walking beam 39 and 41 about the longitudinal axis of the cylindrical bar 36. The rear sections 48 on the walking beams 39 and 41 terminate in a structure identical to the semi-cylindrical housing 49. Thus, and for purposes of identifying this structure in the drawings, the semi-cylindrical housing on the rear sections 48 will be identified by the reference numeral 49A and by the reference numeral 52A for the semi-cylindrical cap. The axes of the semi-cylindrical housings 49A and the semi-cylindrical caps 52 on the walking beams 39 and 41 are both axially aligned and rotatably support an axle 56 therein. The construction inside the semi-cylindrical housing 49A and cap 52A is identical to the structure illustrated in FIG. 9 for effectively rotatably supporting the axle 56 therein.

The hollow axles 51 and 56 are generally identical in construction to that disclosed in my aforesaid U.S. Pat. No. 3,875,870 with the flanged wheels 19 being rotatably supported inwardly of the highway wheels 21. In this particular embodiment, the flanged wheels have a radially outwardly extending flange 57 on the axially innerside thereof as is conventional. The flanged wheels 19 are each rotatably supported on an axis of rotation 58 which is coincident with the axis of rotation of the hollow axles. The high wheels 21, on the other hand, are supported on an axis of rotation 59 which is radially offset by an amount X from the axis of rotation 58 illustrated in FIG. 5. The amount X is generally in the range of 4 to 5 inches (10.2 centimeters to 12.7 centimeters). Thus, and as a result of the rotation of the axles 51 and 56 about their respective axes of rotation 58, the highway wheels 21 are moved between the solid line positions in FIGS. 4 and 5 to the broken line positions thereof. Further details of the specific axle construction are presented in my aforesaid U.S. Pat. No. 3,875,870 and reference thereto is to be incorporated herein.

Each of the axles 51 and 56 (FIG. 6) has a bracket assembly 61 and 62 respectively, fixedly fastened thereto and rotatable therewith. The bracket assembly 61 has a lever arm 63 secured thereto by any convenient means and projecting radially outwardly from the axle 51. Similarly, the bracket assembly 62 has a lever arm 64 fixedly secured thereto and projecting radially outwardly from the axle 56.

A pair of parallel track structures 66 and 67 are suspended from and extend between the axles 51 and 56. The track structure 66 is composed of a pair of parallel, horizontally and laterally spaced H-shaped beams 68 and 69. Each of the H-shaped beams 68 and 69 has an upper horizontally extending flange 71, a lower horizontally extending flange 72, and an intermediate vertically extending bight section 73 interconnecting the upper and lower flanges. The upper and lower flanges 71 and 72 on each beam 68 and 69 are coplaner. Bracing 74 is connected to and extends between the lower flanges 72 on each beam 68 and 69 at spaced intervals along the length of the track. The forward end of the track 66 is secured through a bracket assembly 76 to the front section 47 of the walking beam 39. The rear end of the track 66 is suspended from the rotary axle 56.

Similarly, the front end of the track 67 is suspended from the rotary axle 51. The rear end of the track 67 is secured through a bracket assembly 76A to the rear section 49A of the walking beam 41, which bracket assembly 76A is generally identical to the bracket assembly 76.

More specifically, and referring to FIG. 5, a pair of bushing housings 77 and 78 encircle the rotary axle 56 and facilitate a relative rotation between the axle 56 and the bushing housings. A flange 79 extends downwardly from the bushing housing 77 and is secured to a sidewall member 80 secured to the outside lateral edges of the upper and lower flanges 71 and 72 on the H-shaped beam 68. A flange 81 extends downwardly from the bushing housing 78 and is secured to the top surface of the upper flange 71 of the H-shaped beam 69. Each of the bushing housings 77 and 78 and the axle 56 have conventional structure thereon (not illustrated) for preventing the bushing housings from moving axially along the axle 56. Due to the securement of the forward end of the track 66 to the walking beam 39, this additional connection will prevent any lateral shifting movement of the track 66 relative to the axle 56.

A carriage 82 is reciprocally mounted on the upper surface of the innermost portion of the lower flanges 72 of the H-shaped beams 68 and 69 as shown in FIG. 10. The carriage has a main body portion 83 with an upstanding lug 84 thereon extending between the opposed inner edges of the upper flange 71. The sidewalls of the carriage 82 are covered with a low-friction material liner 86 secured to the main body 83 of the carriage 82 by any conventional means, as by the illustrated screws.

Both the forward and rearward ends of the liner 86 are tapered inwardly toward the geometric center of the main body 83 of the carriage 82 to define a blade 87 for effecting a removal of snow, ice, dirt and other material that may collect on the upper surface of the lower flange 72 on each of the H-shaped beams 68 and 69. Each of the blades 87 is contained in a vertical plane perpendicular to the plane of the upper surface of the lower flanges 72 and extending at approximately a 45 degree angle to a vertical plane passing through the longitudinal center of the main body 83 of the carriage 82.

A link member 88 is pivotally connected to and extends between the lever arm 64 and the lug 84 on the carriage 82. More specifically, the link member 88 has a bifurcated end member 89 which straddles the lever arm 64 and a pin 91 extends through the legs of the bifurcated element 89 and the lever arm 64 to effect the aforesaid pivotal connection between the link member 88 and the lever arm 64. Similarly, the lower end of the link member 88 has a bifurcated element 92 straddling the lug 84. A pin 93 extends through aligned holes in the legs 101 and 102 of the bifurcated element 92 and the lug 84 to effect the aforesaid pivotal connection of the link member 88 to the lug 84. In this particular embodiment, the opposite ends of the pin extend laterally outwardly beyond the legs 101 and 102 of the bifurcated element 92 and over the upper surfaces of the upper flanges 71 on each of the H-shaped beams 68 and 69 as shown in FIG. 7.

A pair of abutment members 96 and 97 are fixedly secured to the upper surface of the upper flanges 71 on each of the H-shaped beams 68 and 69 as illustrated in FIGS. 5 to 7. Each abutment member 96 and 97 has a frontwardly opening recess 98 therein adapted to receive the opposite ends of the pin 93.

Referring now to FIG. 3, a cylinder 103 having a reciprocal rod 104 is fixedly mounted on the track 66 between the H-shaped beams 68 and 69. The free end of the rod 104 is secured to the main body 83 of the carriage 82 as illustrated in FIG. 8. Thus, an appropriate activation of the drive cylinder 103 will effect a reciprocation of the rod 104 and, consequently, a reciprocation of the main body 83 of the carriage 82 along the length of the track 66.

The track 67 is generally identical in construction to the track 66 except for the connection thereof to the walking beam 41 as discussed above. For purposes of convenience, the identical components will be identified in the drawings with the same reference numerals used to describe the track 66 and support therefor but with the suffix "A" added thereto.

The rear end of the H-shaped beam 68A is secured through the bracket assembly 76A. The forward end of the track 67 is secured to the axle 56 through bushing housings 77A and 78A and suspended flanges (not illustrated).

A drive cylinder 106 (FIG. 3) having a reciprocal rod 107 is fixedly mounted between the H-shaped beams 68A and 69A for the track 67. The free end of the reciprocal rod 107 is fixedly secured to a carriage slideably mounted in the track 67. The carriage for the track 67 is identical in construction to the carriage 82 illustrated in FIG. 8. Accordingly, and for simplification in reference, the carriage for the track 67 is identified by the reference numeral 82A as illustrated in FIG. 3.

The carriage 82A is connected to the lever arm 63 on the axle 51 in the same manner as was described herein-above with respect to connection of the carriage 82 to the lever arm 64 on the axle 56. More specifically, and referring to FIG. 6, the same reference numerals have been utilized in association with the connection between the carriage 82A and the lever arm 63 as was used with respect to the structure shown in association with the axle 56 except that the suffix "A" have been added thereto. It is believed that the connection between the carriage 82A and the lever arm 63 will be readily understood based upon the above discussion concerning the link member 88 and the associated structure.

OPERATION

Although the operation of the mechanism described above will be understood from the foregoing description by skilled persons, a summary of such description is now given for convenience.

For purposes of this discussion, it will be assumed that the vehicle 10 has arrived at its destination on the railway track system 100 and is now ready for conversion for use on a highway. Referring to FIG. 1, it will be noted that the flanged wheels 19 are in engagement with the railway track system 100. The first step that is to be performed is to remove the front truck 13. This is accomplished by utilizing the landing gear structure 23 for lifting the front end of the vehicle 10 to facilitate the removal of the truck 13. Thereafter, the fifth wheel arrangement 17 on the highway tractor 18 is connected to the king pin construction 16 and the landing gear 23 is retracted. Thereafter, the highway wheels 21 and 22 are lowered into engagement with the ground and to effect a lifting of the flanged wheels 19 on the truck 12 off from engagement with the track system.

Referring now more specifically to the structure illustrated in FIG. 4, the highway wheels 21 and 22 are initially, based on the assumption set forth above, in the raised position illustrated in broken lines in FIG. 4. In this position, the two link members 88 and 88A and lever arms 63 and 64 are in the broken line positions illustrated in FIG. 6. Thus, the cylinder rod 104 in the track 66 is initially retracted (contrary to the showing in FIG. 3) and, since the drive cylinder 106 operates oppositely to the drive cylinder 103, the reciprocal rod 107 is initially in the extended position (contrary to the showing in FIG. 3). A control panel 108 (FIG. 1) is mounted on the vehicle 10 and serves to facilitate a manual control of the movement of the landing gear 23 and the operation of the drive cylinders 103 and 107. An appropriate manipulation of the controls on the control panel will effect the aforesaid lowering of the landing gear 23 to raise the front end of the vehicle 10 to facilitate the disconnection of the truck 13 and the replacement thereof with the fifth wheel arrangement in a highway tractor and, subsequently, will effect a drive of the drive cylinders 103 and 107 to effect a movement of the carriages 82 and 82A to the solid line positions illustrated in FIG. 6. This movement of the carriages 82 and 82A will effect a 180 degree rotation of the axles 51 and 56 to effect a movement of the highway wheels 21 into engagement with the ground. This engagement will simultaneously lift the rear end of the vehicle 10 upwardly so that the flanged wheels 19 will be elevated above the track system 100. Thereafter, the controls on the control panel 108 can be appropriately manipulated to effectively lower the remainder of the highway wheels 22 into engagement with the ground.

The last step that must be performed before the highway tractor can be permitted to move the vehicle 10 onto the highway is for the rear truck 12 to be fixedly locked to the central beam 11 so that it will not rotate about a vertical pivot axis 12A (of conventional construction) as required when the flanged wheels 19 are in engagement with the track system 100 to facilitate the vehicle 10 to go around curves in the track system. This locking of the rear truck 12 to the center beam 11 can be accomplished by any desired structure, such as bu using plural pins (not illustrated) received in align holes in the center beam 11 (not illustrated) and the support structure 26. For purposes of illustration, plural holes 109 are provided in the cross members 28. Thereafter, the highway tractor 18 can be moved to pull the vehicle 10 onto the highway.

It is to be noted that during the movement of the highway wheels 21 downwardly and into engagement with the ground, the movement is in a counter-clockwise direction as illustrated in FIG. 6. This means that the highway wheels will rotate about the axis of rotation of the respective axles 51 and 56 and also in a counter-clockwise direction (FIG. 4) until the pins 93 and 93A are received in the respective recesses 98 and 98A in the abutment members 96 and 97. The longitudinal axes of the link members 88 and 88A will in this position of the pins 93 and 93A be vertically aligned. The purpose for this construction is to optimize the locking arrangement for the highway wheels in the highway engaging position. If, for example, the vehicle 10 is moving down the highway at an appreciable speed with an appreciable load and it becomes necessary to bring the highway tractor 18 and vehicle 10 to a stop, the application of the brakes on the trailer (see my U.S. Pat. No. 3,875,870 for the appropriate braking system) will cause a torque to be applied to the rotary axles 51 and 56. This counter-clockwise torque will be absorbed by the tensile stress characteristics of the link members 88 and 88A. Similarly, if the operator of the highway tractor 18 inadvertently backs the vehicle so that the highway wheels 21 encounter an appreciable obstruction, the clockwise torque applied to the axles 51 and 56 will be absorbed by the compressive stress characteristics for the link members 88 and 88A.

As the carriages 82 and 82A are moved along the length of the tracks 66 and 67, the appropriate blade 87 on each of the carriages will operate to remove any debris that may have collected on the upper surface of the lower flange on each of the H-shaped beams. Similarly, the blocks of low-friction material 86 on opposite sides of the carriages will minimize friction and simultaneously prevent wear to the main body of each of the carriages.

Although a particular preferred embodiment of the invention has been disclosed in detail for illustrative purposes, it will be recognized that variations or modifications of the disclosed apparatus, including the rearrangement of parts, lie within the scope of the present invention.

The embodiments of the invention in which an exclusive property or privilege is claimed are defined as follows:

1. A convertible rail-highway vehicle, comprising:
   a semi-trailer including an elongated beam extending centrally, longitudinally of said trailer;
   first truck means adjacent the rear of said trailer pivotally connected to said beam for movement about a first vertical axis, said truck means including (a) at least a pair of spaced and parallel axle means for carrying at opposite ends of each thereof a pair of flanged wheel means and a pair of highway wheel means, the axes of rotation of said highway wheel means being radially offset from the axes of rotation of said flanged wheel means;

(b) a laterally extending support member pivotally connected to said elongated beam, said support member having a pivot means thereon; and (c) a pair of elongated and parallel bar means supported on said laterally extending support member and on opposite lateral sides of said beam, said pivot means pivotally supporting each of said bar means on said laterally extending support member for movement about an axis extending transversely of the longitudinal axis of said trailer and universal joint coupling means on each of said bar means coupled to each of said axle means for (1) maintaining the parallel spacing between said axle means, (2) facilitating the movement of said bar means about said pivot means and for (3) supporting each of said axle means for rotation about the longitudinal axis thereof;

releaseable connecting means connecting said trailer selectively to a highway tractor and to a second truck means adjacent the front end of said trailer for pivotal movement also about a second vertical axis; and drive means on said first truck means operatively connected to each of said axle means for effecting a rotary drive of said axle means and a movement of said flanged wheels and said highway wheel means on each of said axle means to an exchanged relation relative to the ground.

2. A convertible rail-highway vehicle according to claim 1, wherein said drive means comprises:

at least one elongated track means secured to said first truck means and extending in a direction parallel to the longitudinal axis of said elongated beam;

a reciprocal drive member mounted on said track means;

carriage means reciprocally movably mounted on said track means between first and second limits and operatively connected to said reciprocal drive member whereby said carriage means is reciprocally driven along said track means;

a lever arm secured to at least one of said axle means and extending radially outwardly therefrom;

a link member pivotally connected to and extending between said carriage means and at least one of said lever arms; and further drive means for rotatably driving the other of said axle means.

3. A convertible rail-highway vehicle according to claim 2, wherein said axes of said highway wheel means is radially offset from the axis of rotation of said axle means and wherein stop means are provided for fixedly holding each of said axle means in a position wherein said highway wheel means engage the ground and said flanged wheels are elevated off the ground to thereby prevent an inadvertent rotation of said axle means.

4. A convertible rail-highway vehicle according to claim 2, wherein said track means extends horizontally in a plane located beneath the plane defined by both of said axle means.

5. A convertible rail-highway vehicle according to claim 2, wherein at least one said lever arm on said axle means, and said link member are related to one another to effect a substantially semicircular rotation of said axle means in response to a reciprocal movement of said carriage means between said first and second limits.

6. A convertible rail-highway vehicle according to claim 1, wherein said drive means is located wholly within the confines of said first truck means and includes a drive member and means for effecting a substantially semicircular rotation of said axle means, both in the same direction.

7. A convertible rail-highway vehicle according to claim 1, wherein each of said universal joint coupling means includes a bushing member having a low friction characteristic slidably encircling said rotatable axle means and compressible means encircling said bushing member and positioned between said bushing member and the ends of each of said bar means, said bushing member facilitating a rotatable support of said axle means therein and said compressible means facilitating a movement of each of said axle means about an axis extending in a horizontal plane perpendicular to said axle means.

8. A convertible rail-highway vehicle according to claim 1, wherein said axis of rotation of said highway wheel means is radially offset from the axis of rotation of said axle means;

wherein said axis of rotation of said axle means is coincident with said axis of rotation of said flanged wheel means;

wherein the longitudinal axis of said link member extends vertically when said highway wheel means are in engagement with the ground; and wherein said stop means fixedly hold said longitudinal axis of said link member in said vertical position so that the torque applied to said axle means tending to rotate same will be countered solely by the tensile stress and compressive stress characteristics of said link member.

9. A convertible rail-highway vehicle according to claim 8, wherein said track means is defined by a pair of opposed and horizontally aligned beams each having a pair of generally parallel and vertically spaced legs connected by a bight section;

wherein said carriage means includes a carriage traversible along the length of said track means between said vertically spaced legs, said carriage having a traverse pin pivotally connected thereto and to said link member, the ends of said pin extending above and overlapping the uppermost legs of said beams; and wherein said stop means include laterally aligned recess means on the upper surface of each of said uppermost legs and are adapted to receive said ends of said pin therein only when said longitudinal axis of said link member is vertically aligned.

10. A convertible rail-highway vehicle according to claim 9, wherein said carriage has blade means on opposite ends thereof slidingly engaging the opposed surfaces of said legs to effect the removal of snow, ice, dirt and other material from said track means that may from time to time collect thereon as said carriage is driven along the length of said track means.

* * * * *